United States Patent
Inamdar et al.

(10) Patent No.: US 10,187,429 B2
(45) Date of Patent: Jan. 22, 2019

(54) SELECTIVE REDUNDANCY FOR MEDIA SESSIONS

(71) Applicant: Cisco Technology, Inc., San Jose, CA (US)

(72) Inventors: Kaustubh Inamdar, Bangalore (IN); Ram Mohan Ravindranath, Bangalore (IN); Vinay Kumar Dharmaraj, Bangalore (IN); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 392 days.

(21) Appl. No.: 15/004,103

(22) Filed: Jan. 22, 2016

(65) Prior Publication Data

US 2017/0214720 A1   Jul. 27, 2017

(51) Int. Cl.
| | |
|---|---|
| *G06F 15/16* | (2006.01) |
| *H04L 29/06* | (2006.01) |
| *H04L 12/801* | (2013.01) |
| *H04L 12/40* | (2006.01) |

(52) U.S. Cl.
CPC .... *H04L 65/1066* (2013.01); *H04L 12/40176* (2013.01); *H04L 12/40182* (2013.01); *H04L 47/10* (2013.01); *H04L 65/608* (2013.01)

(58) Field of Classification Search
CPC ...... H04L 1/1819; H04L 12/40176–12/40182; H04L 29/0651–29/06523; H04L 29/08945–29/08954; H04L 47/10–47/12; H04L 47/24; H04L 65/608; H04L 65/1066
See application file for complete search history.

(56) References Cited

U.S. PATENT DOCUMENTS

| | | | |
|---|---|---|---|
| 7,940,644 B2 | 5/2011 | Oran et al. | |
| 7,969,974 B2 | 6/2011 | Arango et al. | |
| 8,188,886 B2 | 5/2012 | Lazar et al. | |
| 8,489,680 B1* | 7/2013 | Wong | H04L 12/6418 709/203 |
| 2001/0041981 A1* | 11/2001 | Ekudden | H03M 13/35 704/270.1 |
| 2002/0006137 A1 | 1/2002 | Rabenko et al. | |
| 2004/0143672 A1 | 7/2004 | Padrnanabharn et al. | |
| 2004/0215812 A1* | 10/2004 | Lu | H04L 47/32 709/233 |
| 2005/0013249 A1* | 1/2005 | Kong | H04L 29/06027 370/235 |
| 2005/0152548 A1* | 7/2005 | Wasilewski | H04N 7/1675 380/216 |
| 2006/0200845 A1* | 9/2006 | Foster | G08B 13/1966 725/81 |

(Continued)

OTHER PUBLICATIONS

Lei et al. "Multipath real-time transport protocol based on application-level relay (MPRTP-AR)" draft-leiwm-avtcore-mprtp-ar-04. Jul. 2015.*

(Continued)

*Primary Examiner* — Brendan Y Higa
(74) *Attorney, Agent, or Firm* — Parker Ibrahim & Berg LLP; James M. Behmke; Stephen D. LeBarron

(57) ABSTRACT

In one embodiment, a device in a network maintains a plurality of network paths for a media session. The device identifies a subset of data for the media session as requiring redundancy. The device sends a packet in the identified subset of data for the media session as redundant packets via two or more of the plurality of network paths for the media session. The device sends a particular packet outside of the identified subset of data for the media session non-redundantly via one of the plurality of network paths for the media session.

13 Claims, 6 Drawing Sheets

(56) References Cited

U.S. PATENT DOCUMENTS

| | | | |
|---|---|---|---|
| 2007/0076680 A1* | 4/2007 | Amram | H04L 1/0083 |
| | | | 370/349 |
| 2010/0023595 A1* | 1/2010 | McMillian | G06F 15/17 |
| | | | 709/212 |
| 2011/0142034 A1* | 6/2011 | Wu | H04N 21/2343 |
| | | | 370/352 |
| 2015/0026756 A1 | 1/2015 | Reddy et al. | |
| 2015/0207715 A1* | 7/2015 | Ozawa | H04L 45/24 |
| | | | 370/253 |

OTHER PUBLICATIONS

Schulzerinne, H; Taylor, T, "RTP Payload for DTMF Digits, Telephony Tones, and Telephony Signals", RFC 4733, Dec. 2006.*
Camarillo, et al., "The Binary Floor Control Protocol (BFCP)", RFC 4582, Nov. 2006.*
Begen et al. "Duplicating RTP Streams" Internet Engineering Task Force (IETF); Apr. 2014; 12 pages.
Perkins et al. "RTP Payload for Redundant Audio Data" Network Working Group; Sep. 1997; 10 pages.
Zanaty et al. "Congestion Control and Codec interactions in RTP Applications draft-ietf-rmcat-cc-codec-interactions-01" Network Working Group; Oct. 13, 2015; 11 pages.
Stewart et al. "Stream Control Transmission Protocol" Network Working Group; Oct. 2000; 122 pages.
Schulzrinne et al. "RTP Payload for DTMF Digits, Telephony Tones and Telephony Signals" Network Working Group; May 2000; 28 pages.
V. Singh "Multipath RTP (MPRTP) draft-ietf-avicore-rnprtp-01" AVT Core Working Group; Jul. 6, 2015; 41 pages.

\* cited by examiner

SELECTIVE REDUNDANCY FOR MEDIA SESSIONS

TECHNICAL FIELD

The present disclosure relates generally to media sessions in a computer network, and, more particularly, to providing selective redundancy in media session.

BACKGROUND

Various forms of media sessions may be established in a communication network. For example, a media session may support conferencing (e.g., with multiple speakers or presenters), content streaming (e.g., from a single source to an audience), fax communications, application sharing, and the like. Such a session may convey media of a particular type, such as audio or video, or, alternatively, be a multimedia session that conveys multiple forms of media at the same time (e.g., a video conference with audio, etc.).

Typically, media session data is sent as User Datagram Protocol (UDP) packets. UDP packets, in contrast to Transmission Control Protocol (TCP) packets, are often well suited for media applications. In particular, UDP packets use smaller headers than TCP packets and are often processed faster than TCP packets. In addition, unlike TCP, UDP does not use a mechanism that guarantees delivery of any given packet.

As there is no mechanism to ensure delivery of any given packet during a typical UDP-based media session, loss of critical packets (e.g., packets associated with a key event, etc.) can lead to degradation of the user experience. For example, in a typical call center, Dual-Tone Multi-Frequency (DTMF) events can trigger the routing of a call from an interactive voice response (IVR) agent to one or more agents (e.g., the user dials '1' to speak to an account representative). If the corresponding DTMF packets are lost, however, this could impinge on the experience of the user, as the call will not be directed properly to the appropriate agent.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network maintains a plurality of network paths for a media session. The device identifies a subset of data for the media session as requiring redundancy. The device sends a packet in the identified subset of data for the media session as redundant packets via two or more of the plurality of network paths for the media session. The device sends a particular packet outside of the identified subset of data for the media session non-redundantly via one of the plurality of network paths for the media session.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Figure 1:
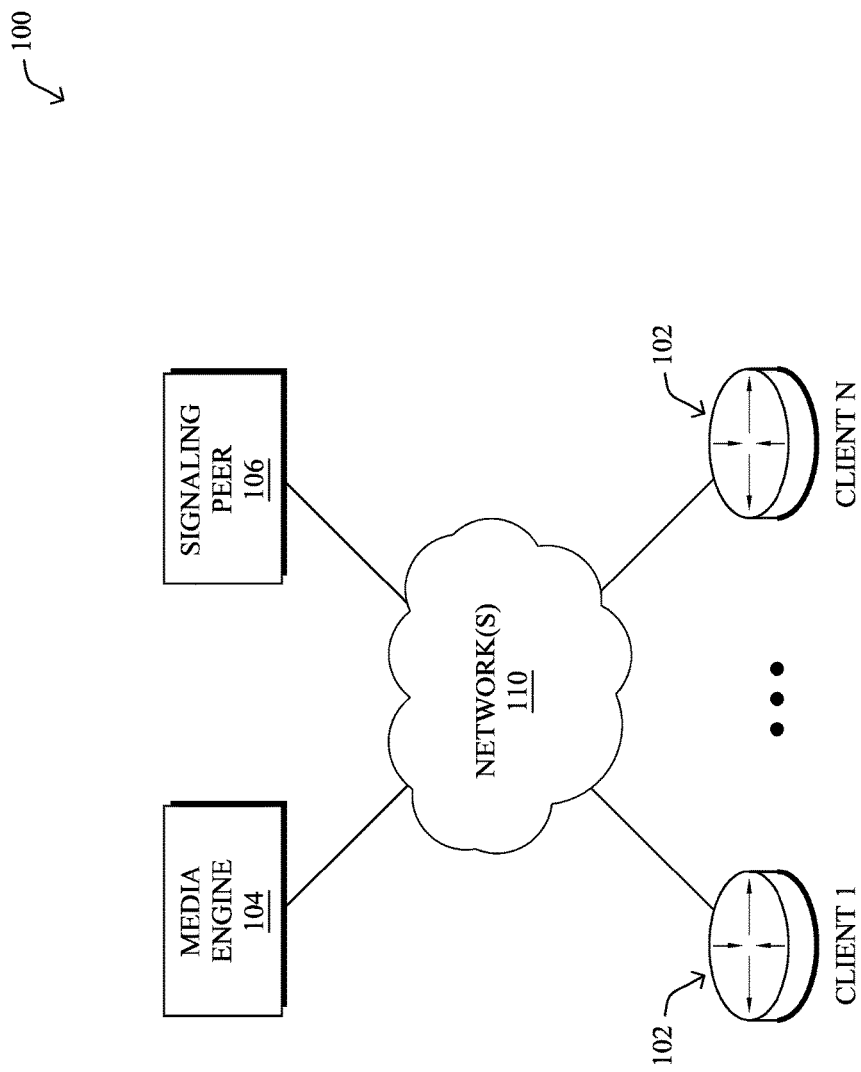
FIG. 1 illustrates an example computing system.

FIG. 1 is a schematic block diagram of an example computing system 100 illustratively comprising any number of client devices 102 (e.g., a first through nth client device), a media engine 104, and a signaling peer 106 in communication with one another via any number of networks 110. The one or more networks 110 may include, as would be appreciated, any number of specialized networking devices such as routers, switches, access points, etc., interconnected via wired and/or wireless connections. For example, devices 102-106 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, PLC, etc.

Client devices 102 may include any number of user devices configured to participate in a media session in which media data is communicated between the participating devices (e.g., audio, video, text, etc.) via network(s) 110. For example, client devices 102 may include, but are not limited to, desktop computers, laptop computers, tablet devices, smart phones, other telephonic devices, wearable devices (e.g., heads up devices, smart watches, etc.), set-top devices, smart televisions, or any other form of computing device capable of participating in a real-time media session via network(s) 110 (e.g., via a web-based application/browser or the like). Client devices 102 may, in further cases, include other devices that handle signaling and media during a real-time communication session. For example, in various embodiments, client devices 102 may include Internet Protocol (IP) telephony devices, a back-to-back user agent (B2BUA), a session border controller (SBC), a Public Switched Telephone Network (PSTN) gateway, etc.

Media engine 104 may be configured to facilitate the transfer of media data between any number of client devices 102 during a media session. Generally, a media engine may be a logical entity than can be configured to facilitate the sending and receiving of data of different types. The actual data types that are communicated via media engine 104 may be negotiated using a signaling channel controlled by signaling peer 106. Example media sessions may include, but are not limited to, voice calls, video conferencing, point to multipoint (P2MP) media streaming, application sharing, and other forms of communicating data in a computer network in real-time. In some embodiments, media engine 104 may be configured to process the communicated media, prior to sending the media on to the endpoint client devices 102. For example, in the case of a voice conference, media engine 104 may merge audio streams from different speakers into a finalized audio stream for the endpoint devices.

Signaling peer 106 may be configured to provide the signaling for a given media session between client devices 102. In particular, signaling peer 106 may implement a signaling protocol to establish a media session between client devices 102. For example, signaling peer 106 may use the Session Initiation Protocol (SIP), the Jingle extension to Extensible Messaging and Presence Protocol (XMPP), WebRTC, or any other media session signaling protocol, to initiate and control a media session between client devices 102 and media engine 104.

Those skilled in the art will understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure. For example, while media engine 104 and signaling peer 106 are illustrated as separate devices, their respective functions described herein may be implemented as a single device, or as part of a cloud-based architecture, in other configurations. In another embodiment, media engine 104 may be implemented as a set of services or micro-services running on one or more virtual machines (VMs), in which case media engine 104 represents the aggregated set of services. In yet another embodiment, some or all of the functions of media engine 104 described herein may be implemented as part of any of client devices 102 shown.

Figure 2:
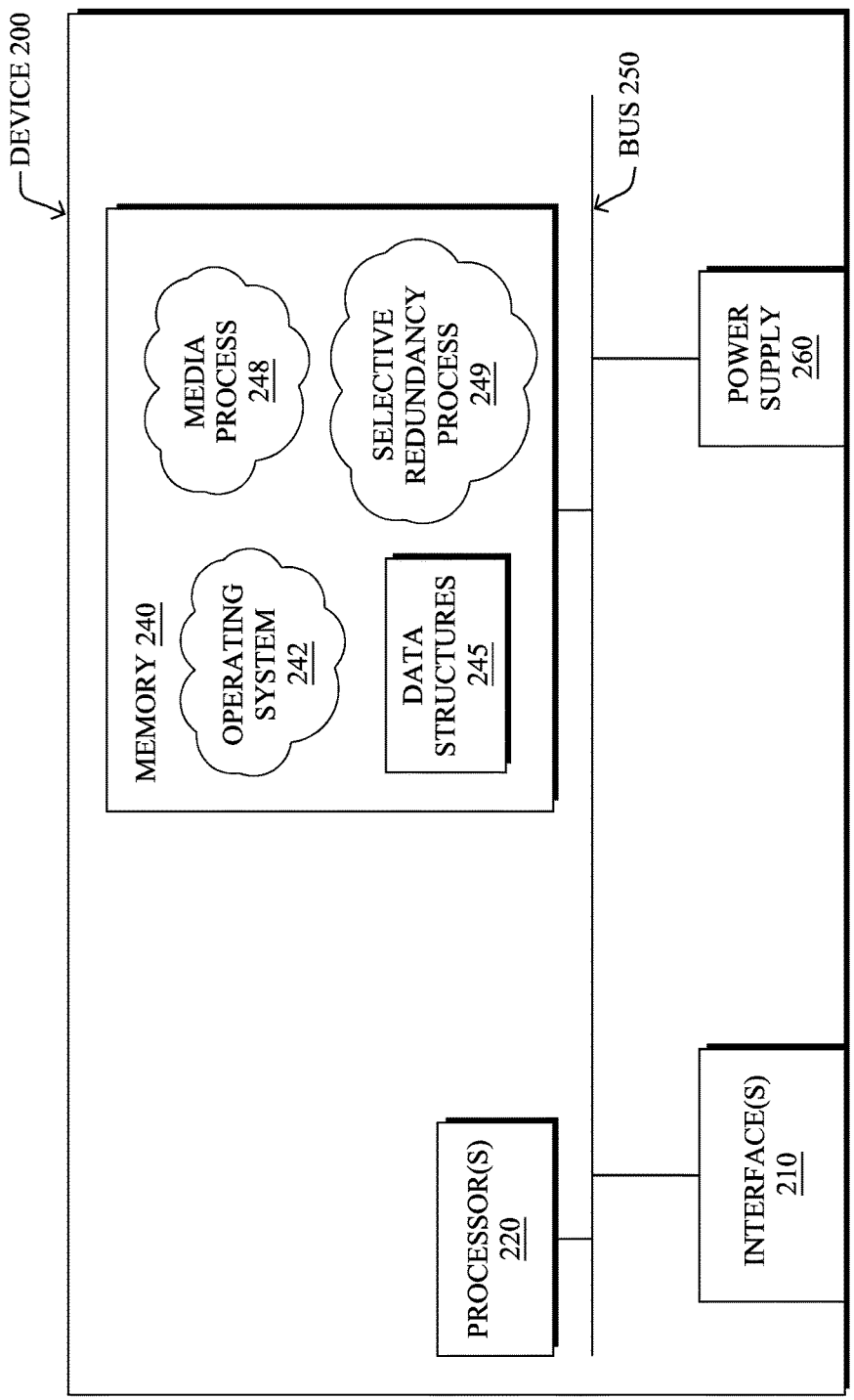
FIG. 2 illustrates an example network device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a media process 248 and/or a selective redundancy process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Generally, media process 248, when executed by processor(s) 220 may be configured to enable a media session between any number of devices participating in the session. For example, when executed by a conference participant, media process 248 may be operable to send media data generated by local device 200 (e.g., audio, video, etc.) to any or all of the other conference participant devices (e.g., via a conference server/media engine). Similarly, when media data is received from another conference participant, media process 248 may be operable to process the received data and/or present the media data to a user via a user interface (e.g., a display, speaker, etc.). In some embodiments, media process 248 may be configured to maintain a media session whereby the media data is conveyed via Real-Time Protocol (RTP) packets, Secure RTP (SRTP) packets, or via any other protocol that supports the communication of media in a network. Signaling for such a session may be in accordance with any of the corresponding signaling protocols such as SIP or the like.

In various embodiments, media process 248 may implement the Multipath extension to RTP, MPRTP, as detailed in the Internet Engineering Task Force (IETF) draft entitled "Multipath RTP (MPRTP)" by Singh et al. In contrast to traditional RTP in which a single delivery path is typically used for endpoints, MPRTP allows the endpoints to be muti-homed, allowing a plurality of network paths to be used for a single media session. For example, packets generated by media process 248 may be assigned to a particular sub-flow, with each sub-flow being represented by a different 5-tuple (e.g., source address, source port, destination address, destination port, and protocol). Sub-flows may also be designated as active or passive, with active sub-flows being used to convey media data, while passive sub-flows are used as fallback paths.

MPRTP may be used over cellular (e.g., 3G, 4G, etc.), WiFi, WLAN, Internet, or the like, where the available paths may not necessarily have great end-to-end characteristics. Thus, selecting the best path over the course of a media session may not be possible as characteristics can change rapidly over time or location. Example techniques to detect congestion in such cases may include, but are not limited to, the RTP Media Congestion Avoidance Techniques (RM-CAT), MPRTP-specific congestion detection techniques, and other mechanisms that may be used to identify congestion on a given path to switch traffic to a better path.

Selective redundancy process 249, when executed by processor(s) 220 may be configured to operate in conjunction with media process 248 to identify and send only a subset of the data for a media session redundantly via two or more paths/sub-flows for the session. As noted above, critical packets, such as those associated with a key event, may disrupt the user experience if the packet does not reach its intended destination. As would be appreciated, however, media sessions often consume a greater amount of network resources than other forms of traffic. Thus, implementing redundancy for the entire media session also may not be practical in many implementations.

Selective Redundancy for Media Sessions

The techniques herein introduce a mechanism whereby multiple paths can be leveraged in a media session to provide redundancy to only a subset of the data for the media session. By selectively sending certain packets redundantly in a media session, the quality of experience (QoE) of the session can be improved, without significantly increasing the consumption of network resources. For example, RTP peers may use the techniques herein to selectively send redundant packets via different MPRTP paths.

Specifically, according to one or more embodiments of the disclosure as described in detail below, a device in a network maintains a plurality of network paths for a media session. The device identifies a subset of data for the media session as requiring redundancy. The device sends a packet in the identified subset of data for the media session as redundant packets via two or more of the plurality of network paths for the media session. The device sends a particular packet outside of the identified subset of data for the media session non-redundantly via one of the plurality of network paths for the media session.

Illustratively, the techniques described herein may be performed by hardware, software, and/or firmware, such as in accordance with processes 248-249, which may contain computer executable instructions executed by the processor 220 (or by an independent processor of network interfaces 210), to perform functions relating to the techniques described herein. For example, the techniques herein may be treated as extensions to conventional protocols, such as the various switched conferencing protocols or privacy and security protocols, and as such, may be processed by similar components understood in the art that execute those protocols, accordingly.

Figure 3:
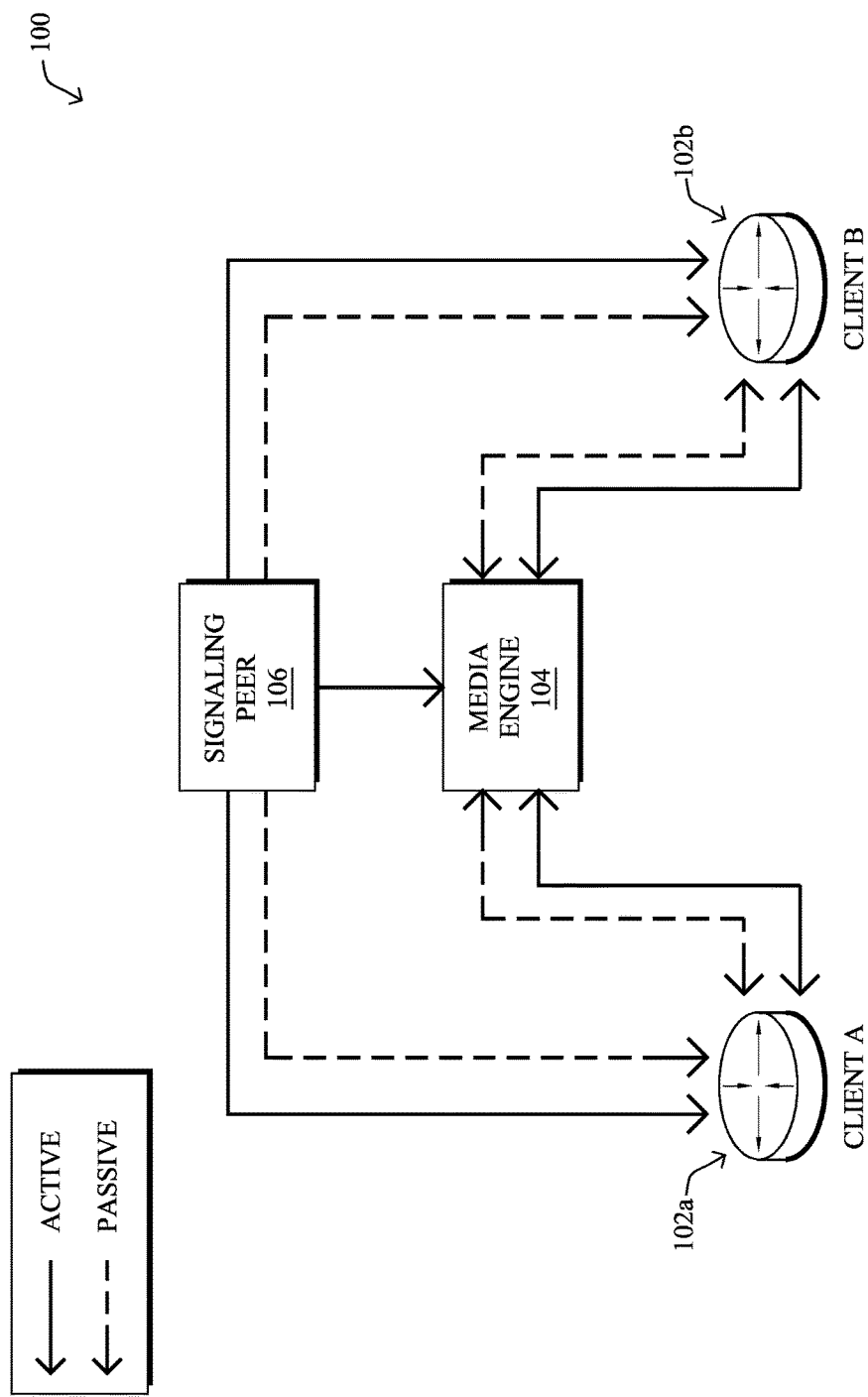
FIG. 3 illustrates an example of multiple paths being maintained for a media session in the system of FIG. 1.

Operationally, an example of multiple paths being maintained for a media session is shown in FIG. 3. As shown, endpoint client devices 102a-102b may establish and maintain a media session by communicating with signaling peer 106, which acts as a call control for the session. In one embodiment, during setup of the session, the endpoint client devices may indicate their support of MPRTP in the corresponding Session Description Protocol (SDP) fields. Once the media session is setup, devices 102a-102b may use MPRTP to establish one or more sub-flows via which data for the media session is to be sent.

As shown, any number of active and/or passive paths may be established for the media session using MPRTP or another such protocol that supports multiple paths for a given media session. Generally, each sub-flow for the session may be assigned to a unique 5-tuple. Of note also is that a given client device 102 may have multiple IP addresses (e.g., on each interface of the device) or multiple IP addresses on the same interface. In addition, it may be possible that any of the servers shown has only one IP address (e.g., a cloud-based media engine 104, etc.). However, so long as the 5-tuple is reachable, multiple sub-flows can still be created between a given client device 102 and the server during the media session.

To establish the paths shown, client devices 102a-102b may each signal to signaling peer 106 their support of MPRTP or another multipath media protocol. This allows the corresponding peer to setup multiple RTP paths for each flow and receive RTP on multiple paths. Next, client devices 102a-102b may allocate multiple ports on each of their respective interfaces and perform an offer answer with its peer. Among other things, the offer/answer exchange may indicate that the endpoint device will use MPRTP. In turn, client devices 102a-102b may indicate redundancy using the appropriate semantics of the media protocol such as, e.g., via RTP headers in the case of RTP.

Once the offer/answer process is complete, client devices 102a-102b may select the best path(s) from among the established paths and begin transmitting data for the media session (e.g., via media engine 104, directly to an endpoint receiver, etc.). Selection of the best path may be performed, in some cases, in accordance with the path selection methodologies outlined in the MPRTP specification, by using the Interactive Connectivity Establishment (ICE) protocol, or by using any other technique (e.g., path selection based on RTT, delay, jitter RTR probes, RMACT techniques, etc.).

Active paths may differ from passive paths, if any exist, in that data for the media session is actually conveyed via an active path. This gives rise to two possible modes of operation. In one mode of operation, the data for the media session may be split over multiple available paths, with each sub-flow having its own well formed RTP header, as described in the MPRTP specification. In other embodiments, however, devices 102a-102b may use MPRTP for redundancy and have one sub-flow as an active sub-flow and maintain the remaining paths as backup paths.

Figure 4A:
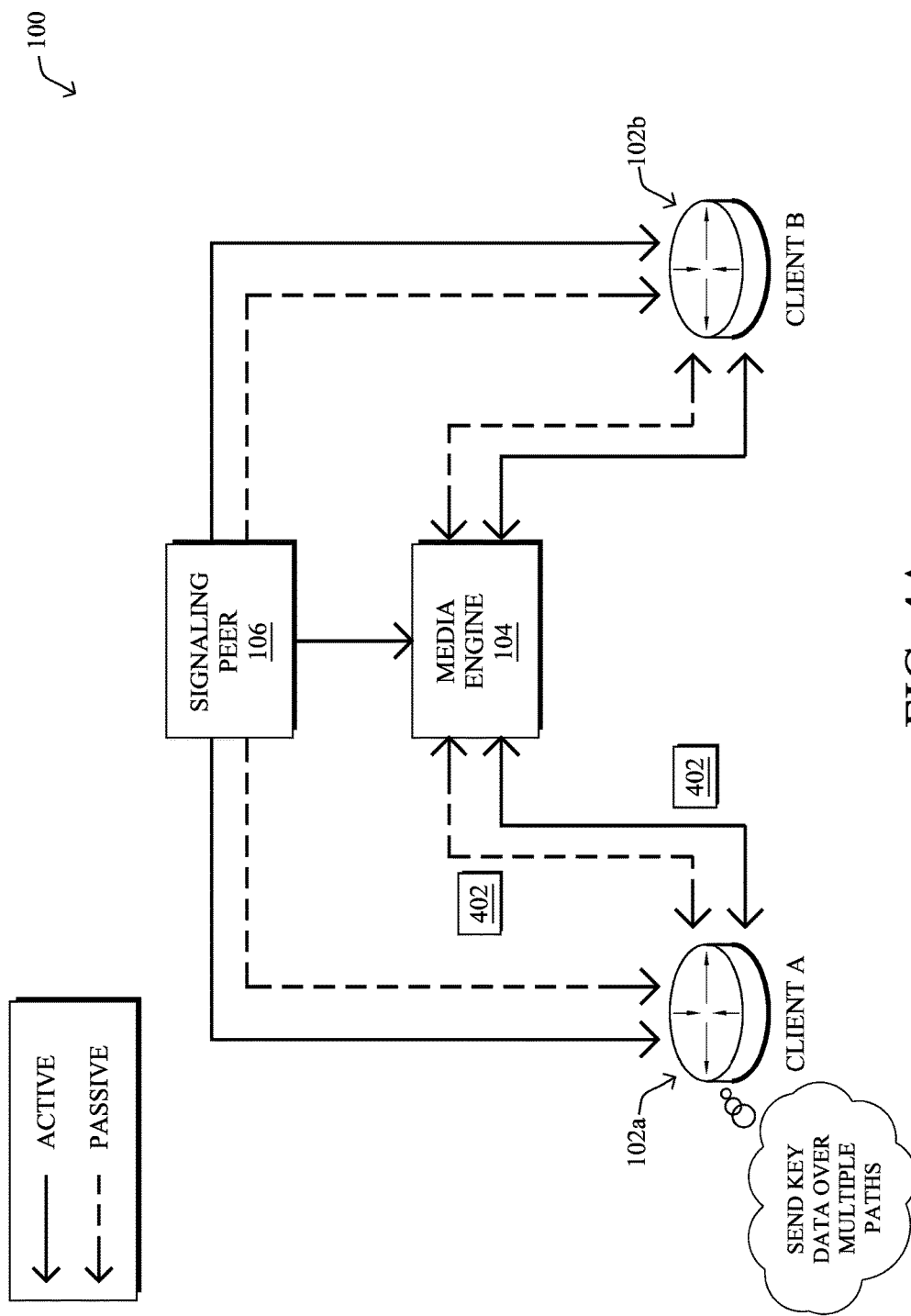
FIGS. 4A-4B illustrate examples of data associated with a media session being sent using selective redundancy.
Figure 4B:
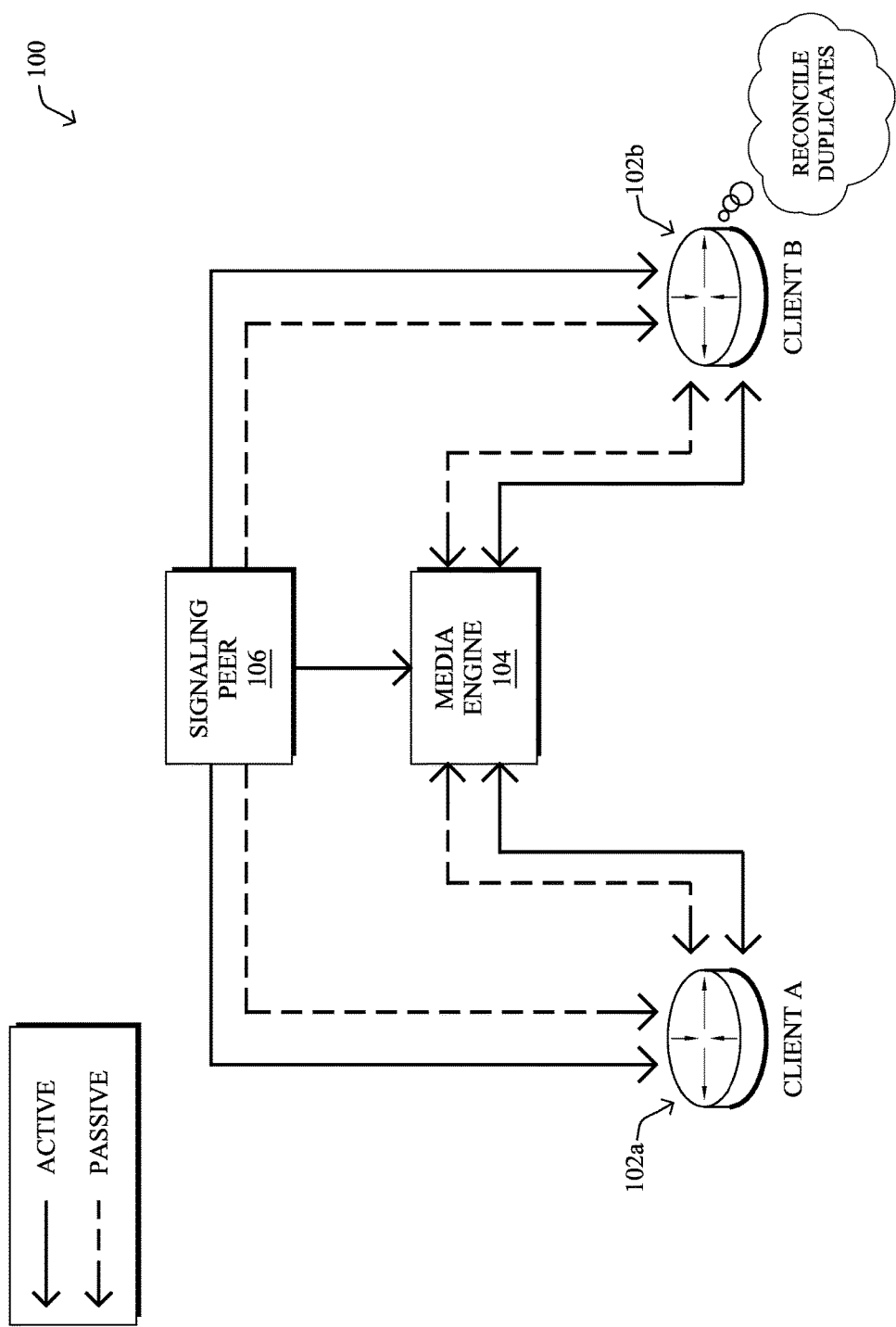

Referring now to FIGS. 4A-4B, examples are illustrated of data associated with a media session being sent using selective redundancy, according to various embodiments. As shown in FIG. 4A, assume that client device 102a is in the mode of operation whereby some of the media session paths remain passive as backup paths. In various embodiments, client device 102a may determine that a particular packet to be sent is in the subset of data that requires redundancy. In other words, client device 102a may determine that data 402 is "key" data that, if lost, would have a significant impact on the experience of the user of client device 102b. In such a case, client device 102a may send the key data 402 redundantly via the primary/active path(s), as well as via the backup/passive path(s), to increase the chances of delivery to client device 102b. Since backup paths are not always in use, ICE or another such protocol may be used to keep a backup path active during the media session. In other cases, as detailed below, multiple paths may also be used under normal circumstances by splitting the data for the session across the paths, to increase throughput. In such cases, redundant packets may be sent on one or more active paths apart from the path on which the packet was originally going to be sent.

In some embodiments, client device 102a may send the key data 402 redundantly, in response to detecting congestion along any of the active sub-flow paths. If congestion is not present on the active path, however, client device 102a may instead send key data 402 in a non-redundant manner. Notably, as the use of redundancy for a media session also increases the consumption of resources, such a mechanism may further limit when selective redundancy is actually used during the media session.

Packets 402 for key data may be sent as redundant RTP packets over multiple paths for the media session. In such a case, the global RTP sequence number of these packets may share the same sequence number across the redundant packets. However, these packets may also have different sub-flow identifiers (IDs) and sub-flow headers, depending on the sub-flows used to convey the packets. Additionally, all packets related to the same key event (e.g., IDR-Frame, etc.) may use monotonously increasing Flow Specific sequence number (FSSN).

As shown in FIG. 4B, the receiver of the key data (e.g., client device 102b, media engine 104, etc.) may reconcile any redundant packets received by the device. For example, client device 102b may begin by sequencing the received packets according to their FSSNs, then by the global sequence number. If client device 102b received multiple packets with the same global sequence number across multiple sub-flows, client device 102b may treat these packets as duplicates and drop or otherwise disregard all but one of the packets. For example, client device 102b may filter redundant packets to select those packets that have no loss of information, as identified using their FSSNs. Once the representative packets have been selected from among the redundant packets, client device 102b may construct the final flow from the selected redundant packets and process the flow, accordingly (e.g., playing the flow, etc.).

In another mode of operation, consider the case in which client device 102a uses all available paths by default during the media session. For example, rather than maintain passive/backup path(s) for the session, client device 102a may instead assign sub-flows to these paths, to increase the overall throughput of the session. In such cases, client device 102a may still select certain key data for redundant transmission (e.g., key data associated with a particular event, such as DTMF digits from a caller to an IVR agent). In one embodiment, to signify redundant packets across the different sub-flows, client device 102a may negotiate a separate payload type (PT) and mark the redundant packets with the PT field. The sequence numbers may still be the same, but the FSSNs may use monotonously increasing values, during this mode of operation.

A receiver of a redundant RTP packet may identify the packet as such by its PT. For example, as shown in FIG. 4B, if client device 102a splits sub-flows across all available paths, client device 102b may examine the PT field of received packets, to identify any redundant packets. In particular, client device 102b may first sequence received packets in a sub-flow by their FSSNs. Then, based on the PT field, client device 102b may identify redundant packets and filter out redundant packets from the finalized stream for further processing. Once the key data has been transmitted over the multiple paths with redundancy, the application may revert back to load balancing traffic over the multiple paths or, alternatively, stream traffic over only a selected set of one or more available paths.

In various embodiments, the techniques herein may be adapted for use with any number of different transport or application protocols that support a media session (e.g., voice, video, presentations, application or file sharing, fax, etc.), in addition to RTP/MPRTP. However, as would be appreciated, many protocols lack a built-in redundancy detection mechanism, such as by detecting redundant packets through the use of sequence numbers. In some embodiments, the receiver of a redundant communication via such a protocol may be configured to identify redundant information by comparing a set of existing fields and/or identifiers that would otherwise be unique for a given event or other type of notification, request, or instruction. For example, the Binary Floor Control Protocol (BFCP) may be used to share the screen of one device to another, but does not use packet sequence numbers. In one embodiment, the receiver of a BFCP communication may be configured to identify redundant BFCP communications by comparing a set of BFCP identifiers that are expected to be unique, such as TransactionID, UserID, FloorID, etc. Other sets of fields/identifiers may be used to identify redundant communications regarding key events, depending on the protocol in use.

The techniques herein also may be adapted for use with any number of different types of events that may be deemed "key" events that require redundant transmissions. In particular, the subset of data for the media session that is to be sent redundantly may be defined by one or more configurable parameters, in some embodiments. In other embodiments, the subset may be hardcoded, such as part of the media application itself.

In one non-limiting example, assume that the media session is a voice call or a voice call with video. In such a case, DTMF events may be deemed "key" events, as loss of packets associated with a DTMF event can significantly impact the user experience. Notably, if a packet for a DTMF event is dropped between the sender and the receiver, this may result in incorrect call routing by the receiving application/IVR, which is particularly true in call centers. In such cases, the techniques herein may be used to selectively send packets associated with DTMF events redundantly, while still sending most of the other packets for the call in a non-redundant manner.

In another non-limiting example, fax calls in a voice over IP (VoIP) network typically begin as voice calls and tone detection is used to trigger a switchover to fax. For example, the IETF RFC 2833 entitled "RTP Payload for DTMF Digits, Telephony Tones, and Telephony Signals" by Schulzrinne et al. defines a named telephony event (NTE) that can be used to trigger a change of state in a voice gateway or analog telephony adapter (ATA) to be suitable for fax transport. Such a changeover may entail changing jitter buffers from an adaptive value to a fixed optimal value, disabling Voice Activity Detection (VAD), disabling an echo canceller/suppressor, etc., to enable fax support. If NTE-related packets are dropped, this could lead to a failure of the fax call. Accordingly, the techniques herein may be used to select NTE-related packets for redundant transmission, while sending other packets of the fax call non-redundantly.

In yet another non-limiting example, some video codecs use predictive encoding whereby a reference frame (e.g., an I-frame) is sent initially with a complete set of encoded video information. Subsequent frames, called P-frames, are then sent with only the video encoding information that has changed since the transmission of the reference frame. An example codec that uses this approach is the H.264 codec, also known as MPEG-4 Advanced Video Coding (MPEG-4 AVC). In another example, the Vp8 and Vp8 codecs also use a "golden frame" as a reference frame, allowing subsequent frames to encode only the changes. In such codecs, dropping packets that correspond to a reference/I-frame during real-time video transmission will lead to poor video quality and a retransmission request from the receiver for the lost frame. The dependence of subsequent P-frames on the I-frame further increases the degradation of video quality, if the I-frame is lost during communication. In one embodiment, the techniques herein may be used to selectively send packets associated with a reference/I-frame redundantly, while sending other frames (e.g., P-frames) in a non-redundant manner. In another embodiment, selective redundancy may also be employed to the P-frames themselves, to further enhance the user experience. For example, every nth P-frame may be sent redundantly, while other P-frames may be sent non-redundantly, providing a tradeoff between reliability and consumed resources.

As a further non-limiting example, application sharing presents another potential form of media session. In particular, a separate media session may be enacted to share a screen capture, file, or other video, apart from a voice/video call. For example, in a call center, a user may share his or her screen to an agent in the call center. In such a case, the endpoint device of the user may negotiate the application media lines to be used. For example, these lines may use BFCP or another protocol for screen sharing. In such cases, key events such as FloorRequest and FloorRequestStatus events may be sent redundantly, while sending other data for the media session non-redundantly (e.g., the display data, etc.), using the teachings herein.

Figure 5:
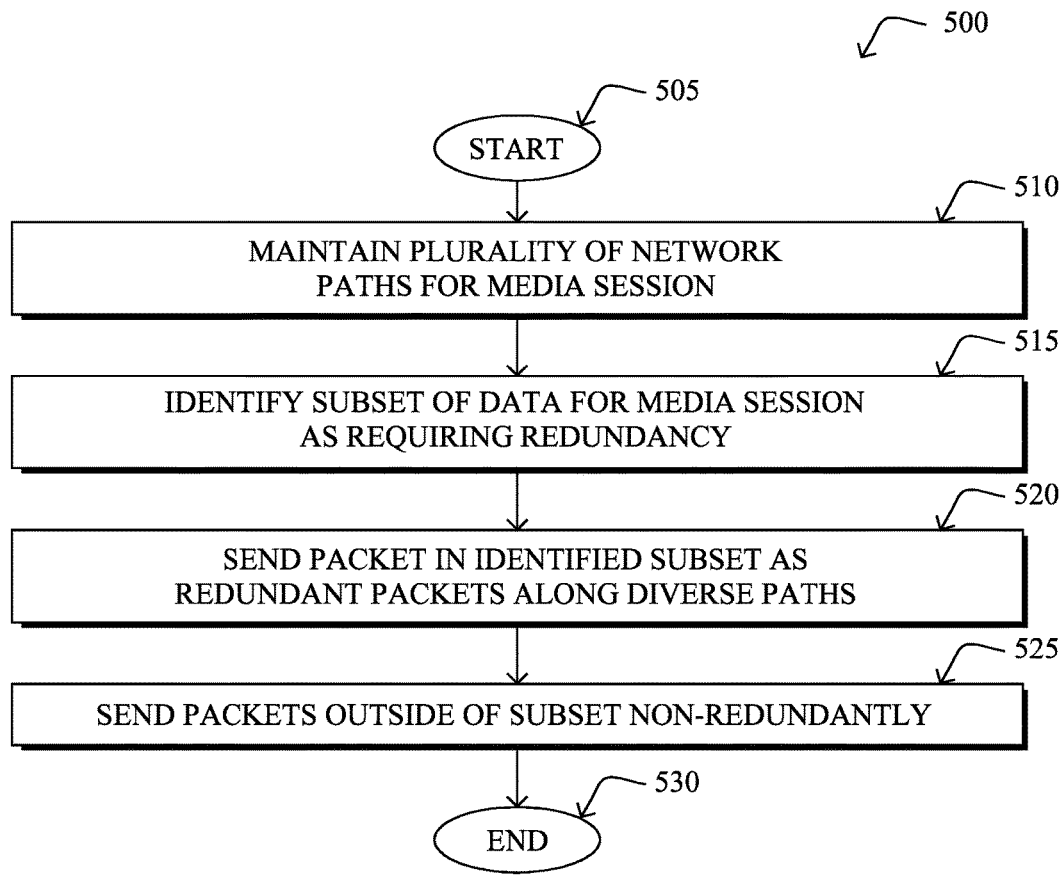
FIG. 5 illustrates an example simplified procedure for using selective redundancy in a media session.

Referring now to FIG. 5, an example simplified procedure is shown for using selective redundancy in a media session, in accordance with one or more embodiments described herein. The procedure 500 may start at step 505 and continue on to step 510 where, as described in greater detail above, a device in a network may maintain a plurality of network paths for a media session. For example, the device may establish and maintain multiple MPRTP paths for a given media session. In some cases, the device may retain one or more of the paths as passive/backup paths, in the case of congestion or other issues along the active/primary path(s). In other cases, the device may increase throughput by utilizing all available paths and dividing the data for the media session into sub-flows assigned to the various paths.

At step 515, as detailed above, the device may identify a subset of the data for the media session as requiring redundancy. In various embodiments, the subset of data requiring redundancy may be associated with key events that, if lost, could have a greater impact on the user experience than other data for the media session. Examples of data that may be identified as requiring redundancy may include, but are not limited to, DTMF data, data associated with an NTE event, data associated with a BFCP event, or select frames in a media stream (e.g., reference/I-frames, every nth P-frame, etc.). Correspondingly, data for the media session outside of the subset may be sent in a non-redundant manner, so as not to drastically increase the resource consumption by the media session.

At step 520, the device may send a packet in the identified subset as redundant packets along two or more diverse paths in the plurality of paths for the media session. In some cases, the device may reserve one or more of the paths as backup paths under normal circumstances and use these paths to send packets in the subset redundantly. For example, the device may send the redundant packets using different sub-flow identifiers or sub-flow headers and monotonously increase the FSSNs, thereby allowing the receiving device to discard redundant packets as needed. In other cases, the device may make use of all available paths to increase throughput of the media session (e.g., by distributing the data for the session across different sub-flows). In such cases, the device may identify redundant packets using a negotiated PT field and monotonously increase the FSSNs for packets associated with a particular key event.

At step 525, as detailed above, the device may also send packets outside of the identified subset in a non-redundant manner. Notably, the device may send a non-critical packet via only one of the plurality of paths for the media session. For example, the device may send I-frame packets in an H.264 session redundantly, while sending the corresponding P-frames in a non-redundant manner. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for selective redundancy during a media session (e.g., an MPRTP session, etc.). In some aspects, packets that may significantly impact the user experience may be sent in a redundant manner, while sending other packets of the session non-redundantly. Doing so may enhance the QoE of the session, while limiting the additional resource consumption needed to effect the redundancy.

While there have been shown and described illustrative embodiments, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of networks and/or protocols (e.g., wireless).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    maintaining, by a device in a network, a plurality of network paths for a media session wherein the plurality of paths for the media session are Multipath Real-Time Protocol (MPRTP) paths;
    identifying, by the device, a subset of data for the media session as requiring redundancy;
    adding, by the device, a same Real-Time Protocol (RTP) sequence number as a primary flow in the media session to the redundant packets;
    adding, by the device, different flow-specific sequence numbers than the primary path to the redundant packets;
    marking, by the device, the redundant packets as redundant using a payload type (PT) field of the redundant packets;
    sending, by the device, a packet in the identified subset of data for the media session as redundant packets via two or more of the plurality of network paths for the media session to a receiver, wherein the receiver reconciles the redundant packets received from the device by sequencing the received packets and deleting packets with the same RTP sequence number but a different flow-specific sequence number; and
    sending, by the device, a particular packet outside of the identified subset of data for the media session non-redundantly via one of the plurality of network paths for the media session.

2. The method as in claim 1, further comprising:
sending the redundant packets via two or more of the plurality of network paths for the media session, in response to detecting congestion along at least one of the plurality of paths for the media session.

3. The method as in claim 1, further comprising:
dividing, by the device, the data for the media session outside of the subset into sub-flows; and
sending, by the device, two or more of the sub-flows simultaneously using different paths in the plurality of paths.

4. The method as in claim 1, wherein the identified subset of data for the media session comprises Dual-Tone Multi-Frequency (DTMF) data.

5. The method as in claim 1, wherein the identified subset of data for the media session comprises data associated with a Named Telephony Event (NTE).

6. The method as in claim 1, wherein the identified subset of data for the media session comprises data associated with a Binary Floor Control Protocol (BFCP) event.

7. The method as in claim 1, wherein the identified subset of data for the media session comprises a particular frame number in a group of pictures.

8. An apparatus, comprising:
one or more network interfaces to communicate with a network;
a processor coupled to the network interfaces and configured to execute one or more processes; and
a memory configured to store a process executable by the processor, the process when executed configured to:
  maintain a plurality of network paths for a media session;
  identify a subset of data for the media session as requiring redundancy;
  add a same Real-Time Protocol (RTP) sequence number as a primary flow in the media session to the redundant packets;
  add different flow-specific sequence numbers than the primary path to the redundant packets;
  mark the redundant packets as redundant using a payload type (PT) field of the redundant packets;
  send a packet in the identified subset of data for the media session as redundant packets via two or more of the plurality of network paths for the media session to a receiver, wherein the receiver reconciles the redundant packets received from the apparatus by sequencing the received packets and deleting packets with the same RTP sequence number but a different flow-specific sequence number; and
  send a particular packet outside of the identified subset of data for the media session non-redundantly via one of the plurality of network paths for the media session.

9. The apparatus as in claim 8, wherein the apparatus is configured to send the redundant packets via two or more of the plurality of network paths for the media session, in response to detecting congestion along at least one of the plurality of paths for the media session.

10. The apparatus as in claim 8, wherein the process when executed is further configured to:
divide the data for the media session outside of the subset into sub-flows; and
send two or more of the sub-flows simultaneously using different paths in the plurality of paths.

11. The apparatus as in claim 8, wherein the identified subset of data for the media session comprises at least one of: Dual-Tone Multi-Frequency (DTMF) data, data associated with a Named Telephony Event (NTE), data associated with a Binary Floor Control Protocol (BFCP) event, or a particular frame number in a group of pictures.

12. A tangible, non-transitory, computer-readable media having software encoded thereon, the software when executed by a processor configured to:
maintain a plurality of network paths for a media session wherein the plurality of paths for the media session are Multipath Real-Time Protocol (MPRTP) paths;
identify a subset of data for the media session as requiring redundancy;
add a same Real-Time Protocol (RTP) sequence number as a primary flow in the media session to the redundant packets;
add different flow-specific sequence numbers than the primary path to the redundant packets;
mark the redundant packets as redundant using a payload type (PT) field of the redundant packets;
send a packet in the identified subset of data for the media session as redundant packets via two or more of the plurality of network paths for the media session to a receiver, wherein the receiver reconciles the redundant packets by sequencing the received packets and deleting packets with the same RTP sequence number but a different flow-specific sequence number; and
send a particular packet outside of the identified subset of data for the media session non-redundantly via one of the plurality of network paths for the media session.

13. The tangible, non-transitory, computer-readable media as in claim 12, wherein the identified subset of data for the media session comprises at least one of: Dual-Tone Multi-Frequency (DTMF) data, data associated with a Named Telephony Event (NTE), data associated with a Binary Floor Control Protocol (BFCP) event, or a particular frame number in a group of pictures.

* * * * *